US012244114B2

(12) United States Patent
Schroll

(10) Patent No.: US 12,244,114 B2
(45) Date of Patent: Mar. 4, 2025

(54) HIGH DEFORMATION AND RETENTION FERRULE

(71) Applicant: TE Connectivity Services GmbH, Schaffhausen (CH)

(72) Inventor: Neil Franklin Schroll, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 74 days.

(21) Appl. No.: 17/527,573

(22) Filed: Nov. 16, 2021

(65) Prior Publication Data

US 2023/0155336 A1 May 18, 2023

(51) Int. Cl.

*H01R 43/18* (2006.01)
*H01R 4/18* (2006.01)
*H01R 4/20* (2006.01)
*H01R 43/048* (2006.01)

(52) U.S. Cl.

CPC ........... *H01R 43/048* (2013.01); *H01R 4/184* (2013.01); *H01R 4/20* (2013.01)

(58) Field of Classification Search

CPC .. H01R 43/048; H01R 43/04; H01R 43/0482; H01R 4/184; H01R 4/183; H01R 4/18; H01R 4/14; H01R 4/20; H01R 4/203; H01R 4/206; H01R 4/22

USPC .......... 439/607.41, 750, 882; 174/91, 92, 93

See application file for complete search history.

(56) References Cited

U.S. PATENT DOCUMENTS

| | | | | |
|---|---|---|---|---|
| 1,310,130 A * | 7/1919 | Murray, Jr. | B21D 53/90 | 138/171 |
| 3,103,373 A * | 9/1963 | Lennon | F16L 19/103 | 285/382.7 |
| 3,174,778 A * | 3/1965 | Gross | F16L 19/10 | 285/341 |
| 3,834,742 A * | 9/1974 | McPhillips | F16L 47/04 | 285/382.7 |
| 4,415,223 A * | 11/1983 | Asick | H01R 9/0518 | 439/879 |
| 4,556,242 A * | 12/1985 | Kowal | F16L 19/10 | 285/341 |
| 5,949,023 A * | 9/1999 | Weyl | G01N 27/4062 | 174/77 R |
| 7,160,150 B2 * | 1/2007 | Annequin | H01R 43/048 | 439/585 |
| 7,240,929 B2 * | 7/2007 | Williams | F16L 19/10 | 285/382.7 |

(Continued)

OTHER PUBLICATIONS

International Search Report, International App. No PCT/IB2022/061046 International Filing Date Nov. 16, 2022.

*Primary Examiner* — Harshad C Patel

(57) ABSTRACT

A cable assembly comprises a conductive cable including an exposed conductive first section having a first cross-section, and a second section adjacent the first second and having a second cross-section distinct from the first cross-section. A ferrule is positioned over the conductive cable and includes a body defining a seam formed therethrough in an axial direction. The ferrule defines a first body portion deformed into a cross-section corresponding to the first portion of the conductive cable, and a second body portion deformed into a cross-section corresponding to the second portion of the conductive cable.

20 Claims, 6 Drawing Sheets

(56) References Cited

U.S. PATENT DOCUMENTS

| | | | | |
|---|---|---|---|---|
| 7,422,480 | B1 * | 9/2008 | Musick | H01R 9/0518<br>439/879 |
| 8,414,329 | B2 * | 4/2013 | Morikawa | H01R 4/185<br>439/585 |
| 9,153,878 | B2 * | 10/2015 | Poma | H01R 4/10 |
| 9,153,879 | B2 * | 10/2015 | Frimmersdorf | H01R 43/16 |
| 9,287,634 | B2 * | 3/2016 | Kawamura | H01R 4/206 |
| 9,379,479 | B2 * | 6/2016 | Ohnuma | H01R 4/187 |
| 9,391,376 | B2 * | 7/2016 | Kawamura | H01R 43/02 |
| 10,008,786 | B2 * | 6/2018 | Brantingham | H01R 13/193 |
| 10,249,995 | B2 * | 4/2019 | Zebhauser | H01R 13/6277 |
| 10,644,414 | B2 * | 5/2020 | Kanemura | H01R 43/16 |
| 10,707,597 | B2 * | 7/2020 | Bergner | H01R 11/28 |
| 10,741,975 | B2 * | 8/2020 | Jones | H01R 13/6583 |
| 10,763,596 | B2 | 9/2020 | Terashima et al. | |
| 10,978,832 | B1 * | 4/2021 | Schroll | H01R 13/6592 |
| 11,482,799 | B2 * | 10/2022 | Iwasawa | H01R 43/048 |
| 2014/0151083 | A1 * | 6/2014 | Ohnuma | H01R 4/62<br>174/93 |
| 2019/0097330 | A1 | 3/2019 | Bergner et al. | |
| 2020/0220277 | A1 * | 7/2020 | Jiang | H01R 43/048 |

* cited by examiner

HIGH DEFORMATION AND RETENTION FERRULE

FIELD OF THE INVENTION

The present disclosure relates to electrical ferrules, and more specifically, to an open type, crimpable ferrule.

BACKGROUND

Ferrules are commonly used to crimp cables onto connectors. Closed tube (i.e., seamless) ferrules typically provide much stronger cable retention and improved electrical performance compared to open type ferrules. However, closed tube ferrules are much more costly to manufacture, and more difficult to apply and crimp to a cable. Conversely, open type or U-shaped ferrules are more efficient to manufacture and assemble to the cable, but are typically weaker in cable retention compared to their tube type counterparts. Sufficient electrical shielding performance may also be more difficult to obtain with open type ferrules, as their designs typically expose cable braiding as compared to the closed tube ferrules which completely contain or cover the cable braid over their length. Incomplete closure of the ferrule is often seen along the joining seems as well, particularly due to insufficient spring-back resistance. The resulting exposed braid is a significant issue, as the potential for electrical shorting is much higher.

Accordingly, improved open type, crimpable ferrules are desired which address these shortcomings, while remaining cost effective to manufacture and assemble.

SUMMARY

In one embodiment of the present disclosure, a cable assembly comprises a conductive cable including an exposed conductive first section having a first cross-section, and a second section adjacent the first second and having a second cross-section distinct from the first cross-section. A ferrule is positioned over the conductive cable and includes a body defining a seam formed therethrough in an axial direction. The ferrule further includes a first body portion deformed into a cross-section corresponding to the first portion of the conductive cable, and a second body portion deformed into a cross-section corresponding to the second portion of the conductive cable.

BRIEF DESCRIPTION OF THE DRAWINGS

The invention will now be described by way of example with reference to the accompanying Figures, of which.

DETAILED DESCRIPTION OF THE EMBODIMENTS

Figure 1:
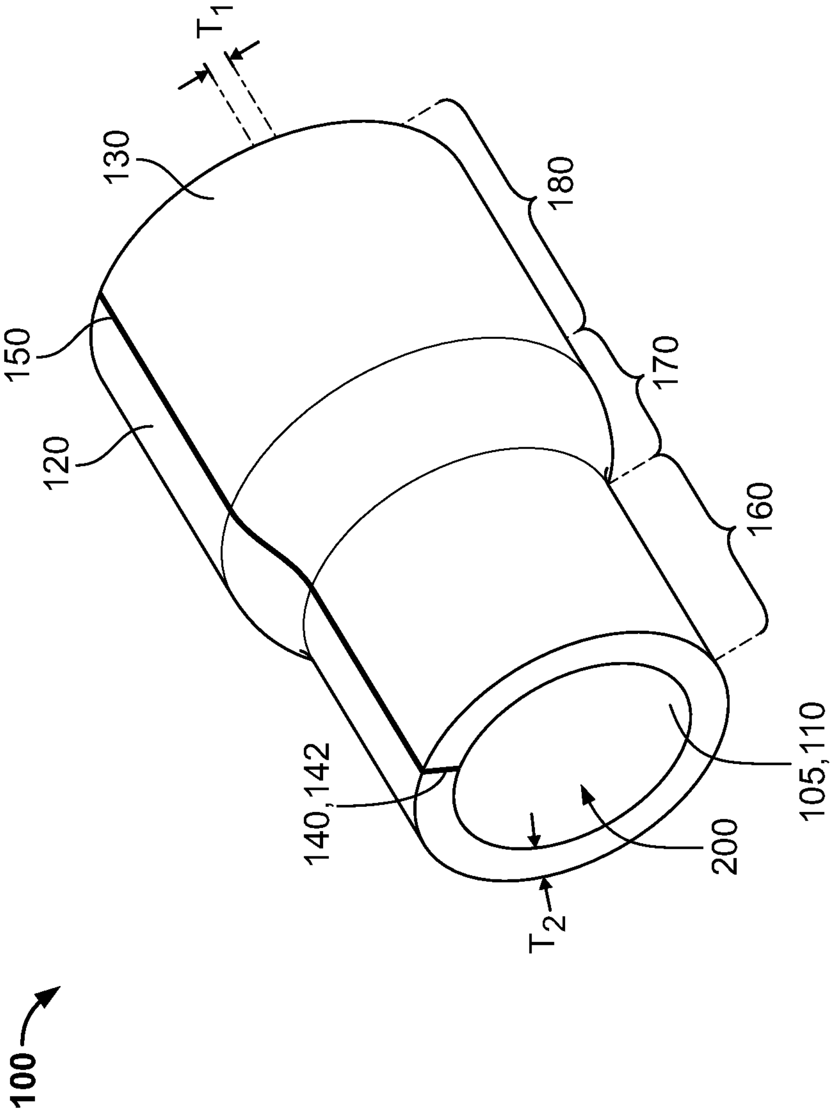
FIG. 1 is perspective view of a ferrule according to an embodiment of the present disclosure in a crimped or closed state.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include a U-type ferrule and a method of use thereof. The ferrule is adapted to be crimped into an O-type ferrule with a varying overall diameter in the form of a material plastic deformation altering the general diameter and thickness of the ferrule in at least one area along its axial length. In this way, one portion of the ferrule may be formed to the shape of, for example, a cable jacket or other component of a cable assembly (e.g., a connector component), while another portion of the ferrule may be securely fastened to exposed internal braiding or conductor(s) of the cable. The deformation of the ferrule prevents spring-back of the closed ends, improving retention and shielding characteristics, as well as minimizing the risk of other failures, such as electrical shorting.

FIG. 1 shows a ferrule 100 according to an embodiment of the present disclosure in a closed or crimped state or position. In the closed position, a body 105 of the ferrule 100 defines a generally hollow tapering cylindrical and/or partially tapering hollow cylindrical shape. The body 105 is formed from respective first and second sidewalls 120,130 extending from a curved base 110. More specifically, through a crimping, stamping, or other processing, the body 105 is plastically deformed into the illustrated form, with the base 110 and sidewalls 120,130 curved into the generally cylindrical shape shown. The resulting opposing free edges or ends 140,142 of the sidewalls 120,130 abut continuously along the length of the ferrule 100 so as to define a closed or generally closed seam 150.

The exemplary body 105 defines a first portion or section 160 having a generally hollow cylindrical cross-section of a first inner and/or outer diameter. A second portion 170 extends continuously from the first portion 160 and defines a tapering hollow cylindrical cross-section of a tapering or varying inner and/or outer diameter. A third portion 180 of the body 105 extends continuously from the second portion 170 and defines another hollow cylindrical cross-section of a second inner and/or outer diameter, greater than the first diameter of the first portion 160. The first, second and third portions 160,170,180 of the body 105 define a coaxial central opening 200 extending in a longitudinal or axial direction of the ferrule 100 and/or a cable associated therewith.

As the body 105 is deformed during crimping, the first section 160 is compressed radially inward under a force greater than that of the third section 180. As a result, a material thickness $T_2$ of the circumferential sidewall of the first section 160 is increased, or is greater than, a thickness $T_1$ of a remainder of the body 105 (i.e., than a thickness of the entire original material thickness of the uncrimped ferrule or stock). In this way, the formation of the portions 160,170,180 includes more than a mere alteration of the exterior dimensions (including the length) of the ferrule, but further alters the in-plane thickness of the base material in the first section.

Figure 2:
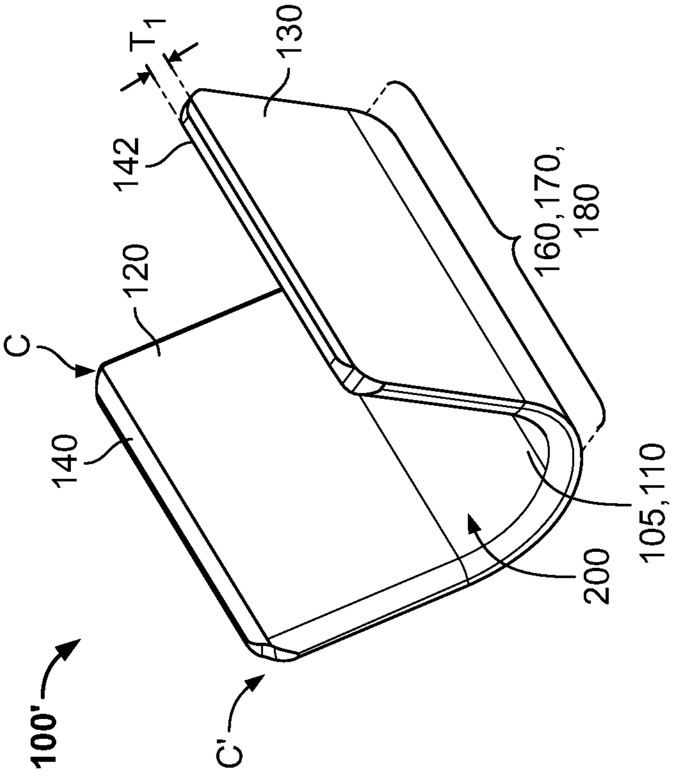
FIG. 2 is a perspective view of the ferrule of FIG. 1 in a pre-crimped or open state.
Figure 3:
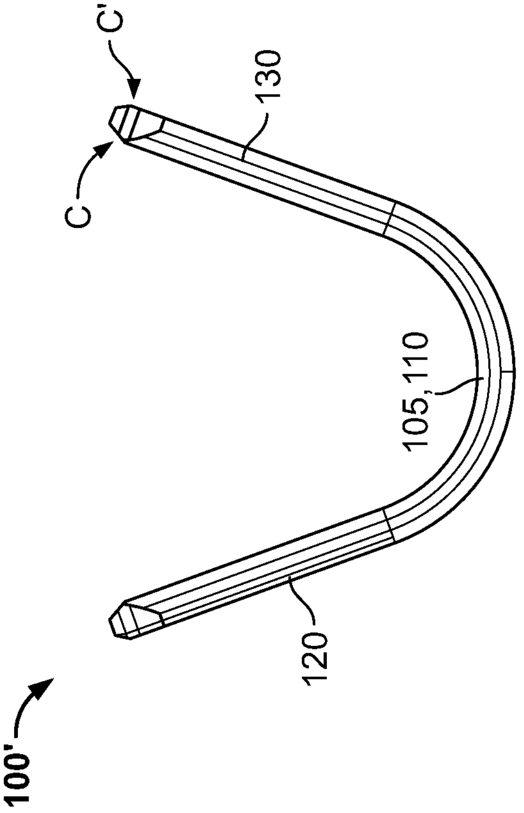
FIG. 3 is a front view of the ferrule of FIG. 2 in the pre-crimped or open state.
Figure 8:
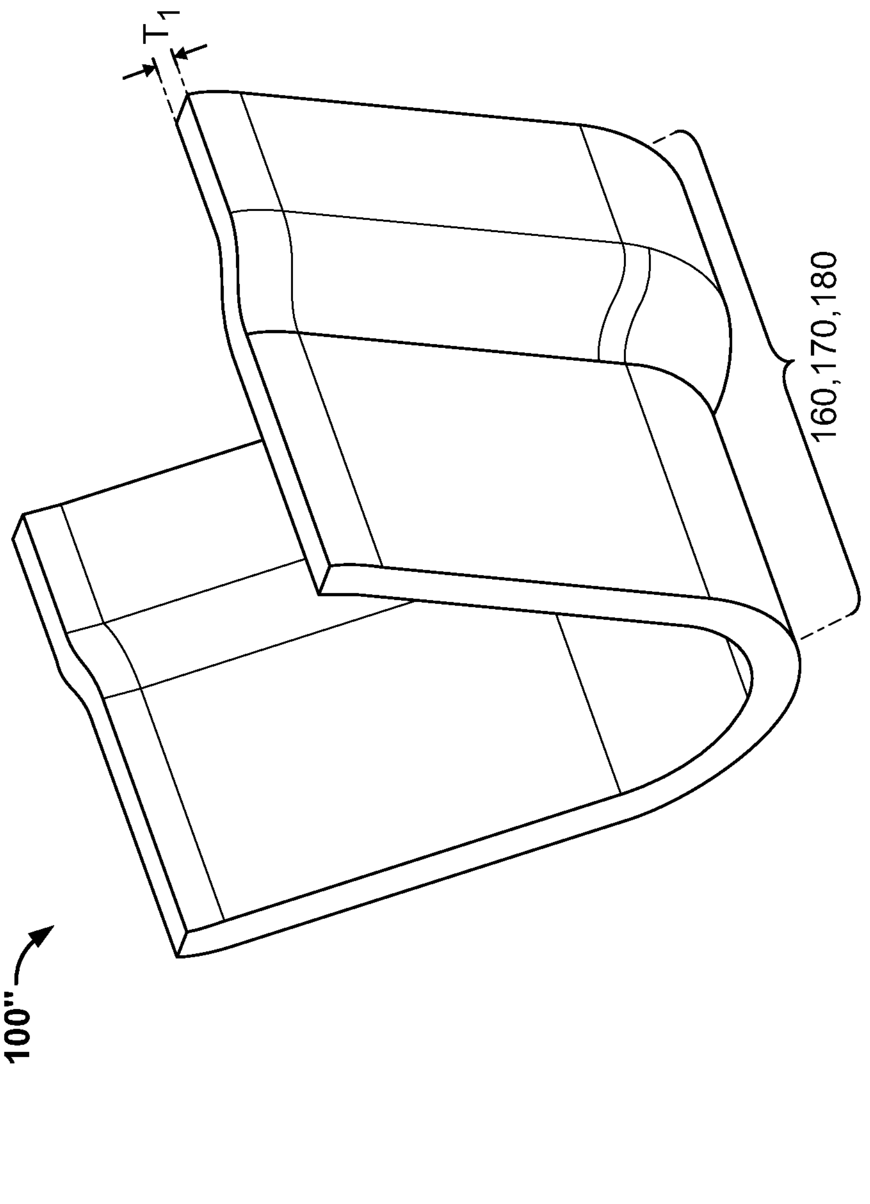
FIG. 8 is a perspective view of a ferrule according to an embodiment of the present disclosure in a pre-crimped or open state.

Referring to FIGS. 2 and 3, the ferrule 100' is shown in an open state, prior to crimping or other forming operations. As shown, the body 105 of the ferrule 100' comprises a generally U-shaped profile or cross-section defined by each of the sidewalls 120,130 extending outwardly and obliquely from a respective side of the base 110. The cross-section of the body 105 is continuous and uniform along its axial length. More specifically, the axial lengths of the base 110 and walls 120,130 are uniform or equal, as are the height of each of the sidewalls 120,130. The body 105 may be formed by processing a single sheet of conductive material, such as copper of a uniform thickness $T_1$. The edges or ends 140,142 of each of the walls 120, 130 may each define a first chamfer C running the longitudinal or axial length of each edge, and/or chamfers C' formed transverse to the axial direction at each corner of the walls 120,130. The chamfers C,C', and specifically the chamfers C may aid in the retention of the walls 120,130 in the abutting manner shown in FIG. 1, resisting the opening or spring-back of the ferrule 100 after crimping or formation. In other embodiments, as shown in FIG. 8, the uncrimped ferrule 100" may be comprise a non-uniform cross-section. More specifically, the ferrule 100" may generally be defined by two U-shaped cross-sections 160,180 of differing sizes joined by a middle tapering section 170. As described above, despite the varying cross-section, in the uncrimped state, the ferrule 100" comprises a uniform thickness $T_1$. The formation of the ferrule 100" with a non-uniform cross-section is advantageous in that it may be more closely fit to a cable jacket and/or cable internal cable shield or conductor prior to a crimping operation. The remaining features of the ferrule 100" are common to the uniform ferrule 100', and the crimped ferrule 100, and therefore will not be described further.

Figure 4:
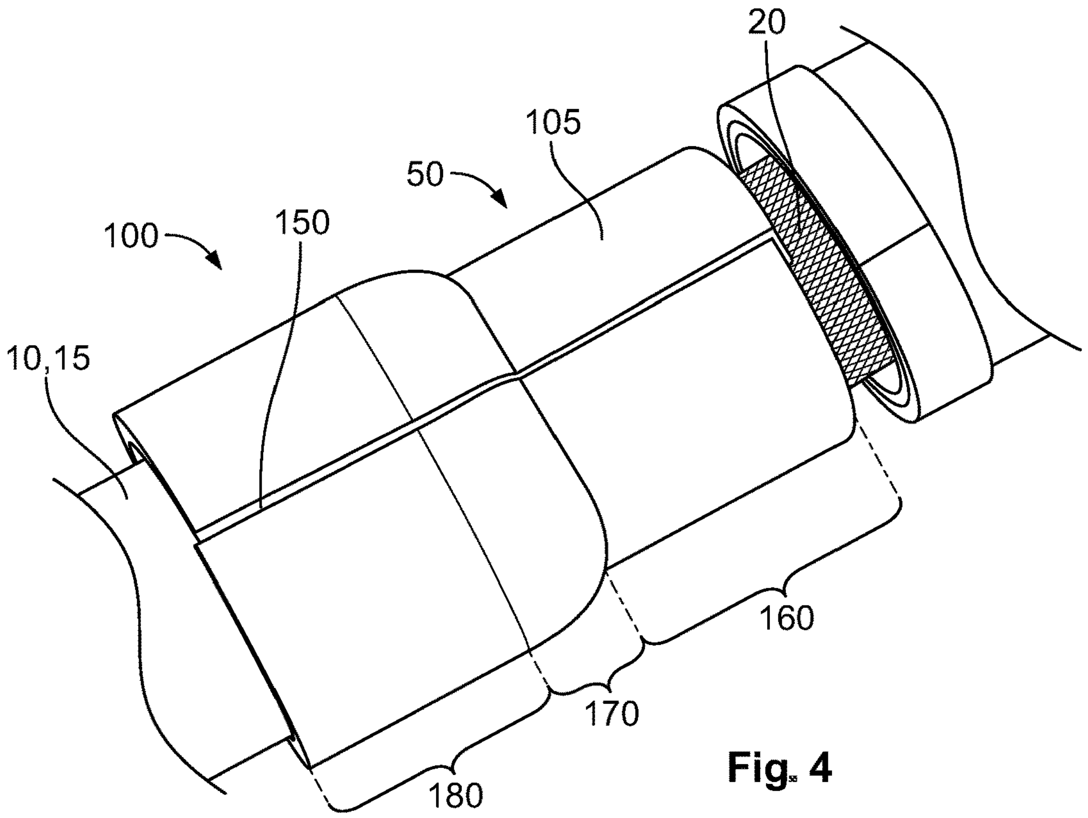
FIG. 4 is a top view of the ferrule of FIG. 1 in the crimped state on a cable assembly.

Referring now to FIG. 4, the closed ferrule 100 is shown in use with, or as part of, a cable assembly 50. The cable assembly 50 may include a cable 10 having at least an outer (or intermediate) jacket 15, as well as at least one internal conductor 20, such as a multi-strand braided central conductor. As shown, the conductor 20 has been exposed via a removal of the jacket 15 in at least one area. In the exemplary embodiment, the cable 10 was inserted into an open ferrule (ferrule 100'), and the ferrule crimped (e.g., in a die) or otherwise plastically deformed to form the first, second and third portions 160,170,180 of the body 105. As shown, at least the first portion 160 of the body 105 corresponds in inner diameter to an outer diameter of the conductor 20, and has been deformed to the exemplary thickness $T_2$. In this way, the ferrule 100 tightly holds and establishes reliable electrical contact with the conductor 20. Likewise, the ferrule 100 is firmly held in place by the third portion 180 of the body 110, which corresponds in inner diameter to an outer diameter of the jacket 15. The stepped nature defined by the second portion 170 of the body 110 aids in preventing the axial translation of the ferrule 100 along the cable 10. Further, the deformation defined by the second portion 170 improves resistance against the ferrule opening or springing-back to an at least partially opened state after crimping. As shown, the seam 150 is uniformly closed along the length of the body 105. In other embodiments, the third portion 180 may be used to attach to an internal portion of a cable (e.g., a shield or a conductor) which has a greater diameter than a jacket of a cable connected to first portion 160.

Figure 5:
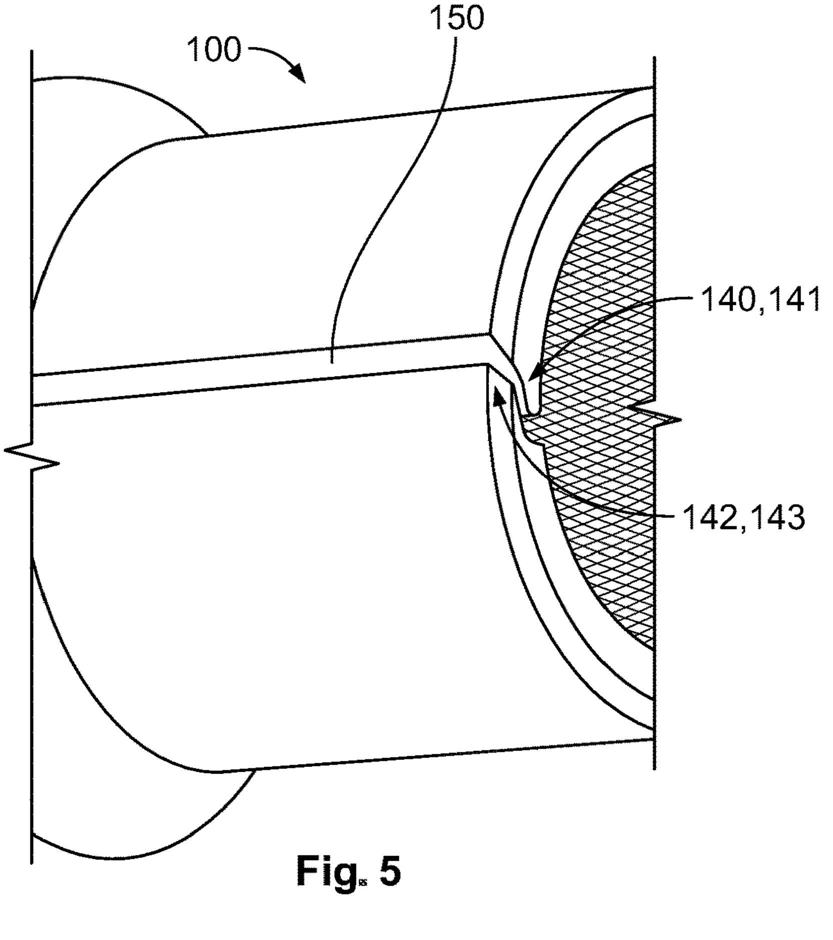
FIG. 5 is a perspective view showing a joining seam of a ferrule according to an embodiment of the present disclosure.

Referring to FIG. 5, in an embodiment of the present disclosure, the free edges 140,142 of the body of the ferrule 100 may define engaging or corresponding protrusions and recesses extending along the longitudinal length of each of the sidewalls of the ferrule 100. Specifically, the exemplary edge 140 may define a protruding lip 141 extending in the circumferential direction and into a corresponding recess 143 formed in the opposing sidewall edge 142. As illustrated, both the protrusion or lip 141 and recess 143 extend in the longitudinal direction over the length of the ferrule, and are offset in the radial direction with respect to one another. In this way, the closed ferrule 100 can maintain a uniformly circular outer profile and maximize the closure of the seam 150. This arrangement may also improve braid retention of the ferrule when used with stranded conductors.

Figure 6:
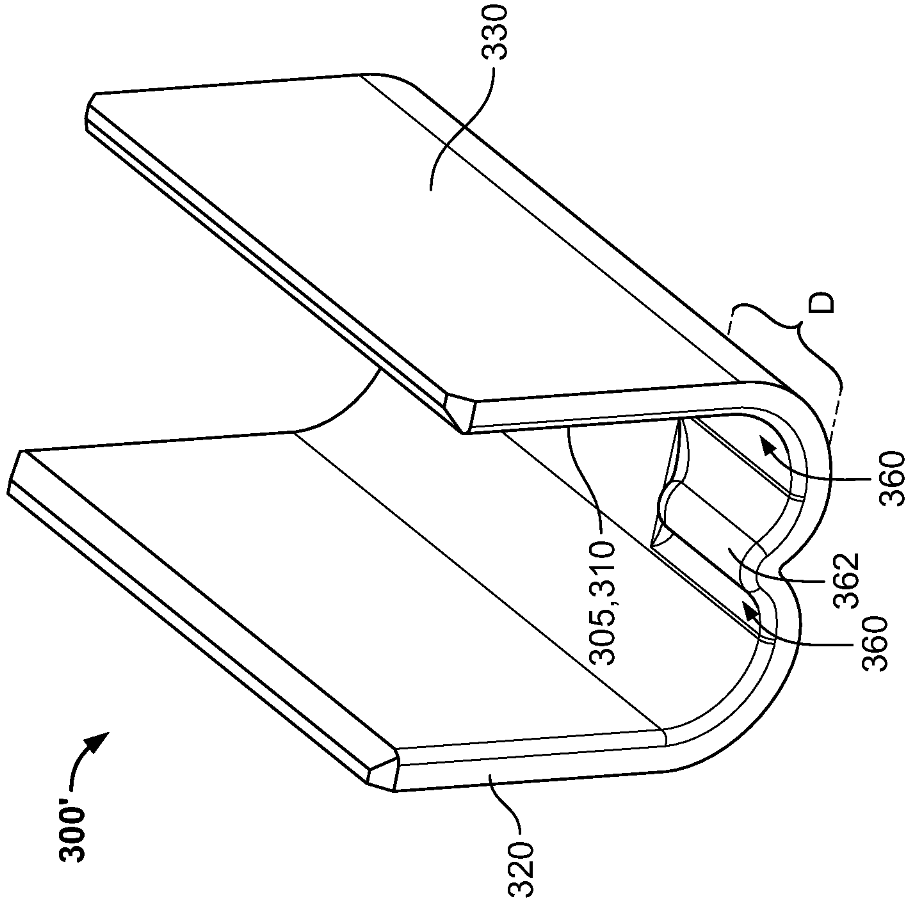
FIG. 6 is a perspective view of a ferrule according to an embodiment of the preset disclosure in a pre-crimped or open state.

It should be understood that the ferrules according to embodiments of the present disclosure may be fitted to other types of components having other shapes without departing from the scope of the present invention. For example, referring to the embodiment of FIGS. 6 and 7, another ferrule 300,300' is shown. In the open state shown in FIG. 6, the ferrule 300' comprises a U-shaped body 305 having a base 310 and two sidewalls 320,330 similar to those set forth above with respect to the ferrule 100,100'. In the exemplary embodiment, however, the ferrule 300' may be configured to secure on a first end to a pair of electrical connectors or terminals, or to a single connector or terminal configured to hold two conductors. This may be enabled by forming (e.g., stamping) a pair of recesses or channels 360 into the base 310. In the exemplary illustrated embodiment, the formation of the channels 360 results in the presence of an arcuate rib 362 extending in the axial direction. The channels 360 extend axially into the base 310 to a depth D corresponding, for example, to a desired depth of a terminal or connector to be captured by the ferrule 300'.

Figure 7:
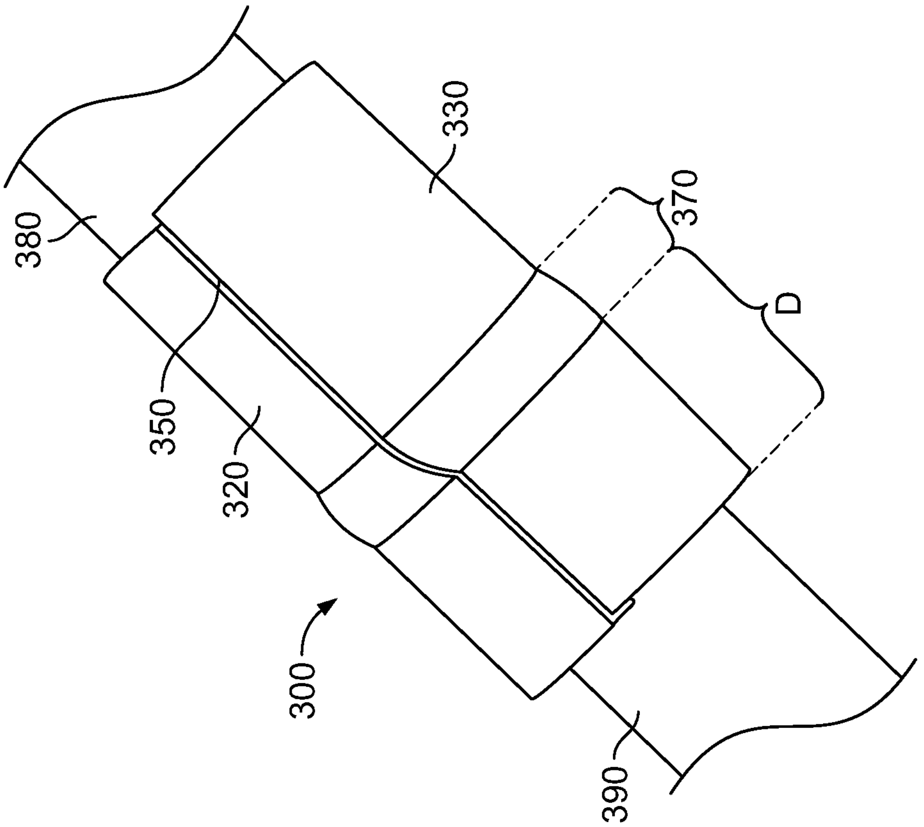
FIG. 7 is a perspective view of the ferrule of FIG. 6 in a crimped or closed state.

The ferrule 300 is illustrated in the closed or crimped state in FIG. 7. On a first end of the ferrule 300, the portion of the ferrule associated with the channels 360 extending to the depth D has been plastically deformed to correspond in shape or cross-section to an electrical terminal or connector 390 defined by at least two semi-circular bodies. On an opposite or second end of the ferrule 300 (i.e., corresponding to the third portion 180 of the ferrule 100), the sidewalls 320,330 have been deformed into a corresponding generally cylindrical shape for securing to a cable or cable jacket 380. An intermediate or central portion 370 of the ferrule 300 forms a continuous transitional profile between the first and second ends. Despite the distinction cross-sections of the first and second ends, the controlled crimping or deformation processing has maintained a closed seam 350 over the axial length of the ferrule 300, improving electrical shielding, and overall mechanical stability of the ferrule.

In view of the above-described embodiments, a method of forming a ferrule for use with a cable or cable assembly is also provided. The method includes the steps of fitting a conductive cable into an uncrimped ferrule. The uncrimped ferrule comprises a generally uniform U-shaped cross-section, as shown throughout the figures. In one or more crimping steps, a first section of the ferrule is crimped into a cross-section corresponding to a first cross-section of a first section of the cable, and a second section of the ferrule is crimped into a cross-section corresponding to a second cross-section of a second section of the cable, distinct from the first cross-section. Either through the crimping steps, or through a separate closing step, opposing edges of the ferrule are abutted along a longitudinal or axial direction of the cable (or ferrule) for closing the ferrule continuously about its circumference and along its length.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A cable assembly, comprising:

a conductive cable, including:

a conductive first section having a first generally circular cross-section; and a second section having a second generally circular cross-section distinct from the first cross-section; and a ferrule positioned over the conductive cable and including a body defining:

a seam formed through the body in an axial direction;

a first body portion formed into a cross-section corresponding to the first section of the conductive cable and having a first diameter; and a second body portion formed into a cross-section corresponding to the second section of the conductive cable and having a second diameter, greater than the first diameter, a thickness of a circumferential wall of the first body portion of the ferrule is greater than a thickness of a circumferential wall of the second body portion of the ferrule.

2. The cable assembly of claim 1, wherein the seam is defined by continuously abutting, free edges of an annular wall of the body for closing the ferrule continuously about its circumference and along its axial length.

3. The cable assembly of claim 2, wherein the abutting edges of the body define opposing protrusions and recesses extending along the axial length of the body, each protrusion being inserted into each corresponding recess with the ferrule.

4. The cable assembly of claim 3, wherein the protrusions and recesses extend along an entire axial length of the body.

5. The cable assembly of claim 3, wherein the protrusion and the recess of each abutting edge of the body are offset from one another in a radial direction relative to a central axis of the ferrule.

6. The cable assembly of claim 2, wherein one of the abutting edges of the body defines a first protrusion extending along the axial length of the body, and the other one of the abutting edges of the body defines a first recess extending along the axial length of the body and receiving the protrusion.

7. The cable assembly of claim 6, wherein the first protrusion and the first recess are offset from one another in a radial direction relative to a central axis of the ferrule and overlap one another in a circumferential direction of the ferrule.

8. The cable assembly of claim 7, wherein the first protrusion and the first recess extend uniformly and continuously along an entire axial length of the body.

9. The cable assembly of claim 7, wherein:

the one of the abutting edges defining the first protrusion further defines a second recess offset from the first protrusion in the radial direction; and the other one of the abutting edges defining the first recess further defines a second protrusion offset from the first recess in the radial direction, the second recess receiving the second protrusion continuously along an entire axial length of the body.

10. The cable assembly of claim 2, wherein each one of the abutting edges defines a chamfer extending along an entire axial length thereof.

11. The cable assembly of claim 10, wherein each one of the abutting edges defines corner chamfers formed on each end thereof.

12. The cable assembly of claim 1, wherein the second section of the cable includes a cable jacket fitted over at least one internal conductor of the cable.

13. The cable assembly of claim 1, wherein the ferrule is formed from a single U-shaped body of generally uniform cross-section.

14. The cable assembly of claim 1, wherein a third body portion of the ferrule includes a tapering annular profile between the first body portion and the second body portion.

15. A cable assembly, comprising:

a conductive cable, including:

a conductive first section having a first cross-section; and a second section having a second cross-section distinct from the first cross-section; and a ferrule positioned over the conductive cable and including a body defining:

a seam formed through the body in an axial direction, the seam defined by continuously abutting, free edges of an annular wall of the body for closing the ferrule continuously about its circumference and along its axial length, the abutting edges of the body define opposing protrusions and recesses extending along the axial length of the body, each protrusion being inserted into each corresponding recess with the ferrule, the protrusions and recesses extend uniformly and linearly along the axial length of the body;

a first body portion formed into a cross-section corresponding to the first section of the conductive cable and having a first diameter; and a second body portion formed into a cross-section corresponding to the second section of the conductive cable and having a second diameter, greater than the first diameter, a thickness of a circumferential wall of the first body portion of the ferrule is greater than a thickness of a circumferential wall of the second body portion of the ferrule.

16. A cable assembly, comprising:

a conductive cable, including:

a conductive first section having a first cross-section; and a second section having a second cross-section distinct from the first cross-section; and a ferrule positioned over the conductive cable and including a body defining:

a seam formed through the body in an axial direction;

a first body portion formed into a cross-section corresponding to the first section of the conductive cable, the first body portion defining:

a first circumferential wall having a first thickness;

a pair of recesses formed in a base thereof and extending in the axial direction, the pair of recesses formed into the base to a first depth in a thickness direction of the first circumferential wall, the first depth less than the thickness of the first circumferential wall in the thickness direction; and a rib extending in the axial direction and arranged between the pair of recesses in a direction transverse to the axial direction; and a second body portion formed into a cross-section corresponding to the second section of the conductive cable, the second body portion including a second circumferential wall, the thickness of the first circumferential wall is greater than a thickness of the second circumferential wall.

17. The cable assembly of claim 16, wherein the pair of recesses and the rib are each elongated and extend parallel to one another into the first body in the axial direction to a depth less than an axial length of the ferrule.

18. The cable assembly of claim 17, wherein the pair of recesses and the rib extend into the first body from a free axial facing end thereof in the axial direction and opposite the second body.

19. The cable assembly of claim 16, wherein the rib is arranged opposite the seam in a circumferential direction of the ferrule.

20. The cable assembly of claim 16, wherein the first circumferential wall extends from the base in each of a first circumferential direction and a second circumferential direction opposite to the first circumferential direction, wherein the seam is defined between free ends of the first circumferential wall.

* * * * *